US011999391B2

(12) United States Patent
Piparsaniya

(10) Patent No.: US 11,999,391 B2
(45) Date of Patent: Jun. 4, 2024

(54) END-OF-TRAIN DEVICE WITH AUDIO SUPPORT

(71) Applicant: Siemens Mobility, Inc., New York, NY (US)

(72) Inventor: Harsh Piparsaniya, Pune (IN)

(73) Assignee: SIEMENS MOBILITY, INC., New York, NY (US)

( * ) Notice: Subject to any disclaimer, the term of this patent is extended or adjusted under 35 U.S.C. 154(b) by 276 days.

(21) Appl. No.: 17/448,584

(22) Filed: Sep. 23, 2021

(65) Prior Publication Data

US 2023/0088607 A1     Mar. 23, 2023

(51) Int. Cl.
*B61L 15/00*  (2006.01)
*B61L 1/14*   (2006.01)
*G06F 3/16*   (2006.01)

(52) U.S. Cl.
CPC .............. *B61L 15/0054* (2013.01); *B61L 1/14* (2013.01); *B61L 15/0081* (2013.01); *G06F 3/167* (2013.01)

(58) Field of Classification Search
CPC .... B61L 15/0054; B61L 15/0081; B61L 1/14; G06F 3/167
See application file for complete search history.

(56) References Cited

U.S. PATENT DOCUMENTS

2017/0253258 A1*    9/2017  Bramucci ........... B61L 15/0054

* cited by examiner

*Primary Examiner* — Jacob M Amick
(74) *Attorney, Agent, or Firm* — Schmeiser, Olsen & Watts LLP

(57) ABSTRACT

An improved End-of-Train device suitable for mounting on a train is disclosed. The End-of-Train device comprises an audio input unit configured to detect an audio input associated with at least one event, and to generate an audio signal based on the audio input. The event is one of an utterance of a voice command by a railway personnel or an incident that potentially impacts an operation of the train. The End-of-Train device further comprises a memory and a processing unit communicatively coupled to the memory. The processing unit is configured to execute one or more instructions in the memory to analyze an audio input to identify one or more actions to be performed by the End-of-Train device and to initiate execution of the one or more actions identified. Further, a notification may be generated based on execution of the one or more actions.

20 Claims, 3 Drawing Sheets

END-OF-TRAIN DEVICE WITH AUDIO SUPPORT

FIELD OF INVENTION

The present invention relates to an End-of-Train device, and more particularly relates to an improved End-of-Train device capable of supporting audio functionalities.

BACKGROUND

End-of-Train devices are widely used in trains in place of a caboose in order to monitor critical parameters such as brake line pressure and also to monitor events such as accidental separation of the train. Typically the End-of-Train device is configured for an operation using hard keys provided on a body of the End-of-Train device. The operation may be associated with, for example, arming, switching ON or OFF of air generator inside the End-of-Train device etc. However, the railway personnel configuring the End-of-Train device should be aware of functionalities of the various keys. Further, at present End-of-Train device provides only visual indications and is not capable of supporting audio notifications. In light of the above, there exists a need for an improved End-of-Train device that supports audio functionalities.

SUMMARY

In an aspect, an End-of-Train device suitable for mounting at on a train is disclosed. The End-of-Train device comprises an audio input unit configured to detect an audio input associated with at least one event, and to generate an audio signal corresponding to the audio input. In an embodiment, the event is utterance of a voice command by a railway personnel. In another embodiment, the event is an incident with a potential impact on operation of at least one equipment onboard the train. The End-of-Train device further comprises a memory and a processing unit communicatively coupled to the memory. The processing unit is configured to execute one or more instructions in the memory to analyze the audio signal to identify one or more actions to be performed by the End-of-Train device, and to initiate execution of the one or more actions identified. In an embodiment, the one or more actions is associated with controlling an operation of the End-of-Train device. In an embodiment, the End-of-Train device further comprises an audio output unit configured for outputting the notification in audio format.

In another aspect, a method for providing audio support on an End-of-Train device is disclosed. The method comprises receiving an audio signal, by a processing unit. The audio signal is generated from an audio input associated with at least one event, detected by an audio input unit communicatively coupled to the processing unit. In an embodiment, the event is utterance of a voice command by a railway personnel. In another embodiment, the event is an incident with a potential impact on operation of at least one equipment onboard the train. In an embodiment, the incident is associated with a shunting operation. In another embodiment, the incident is associated with passing of the train over a faulty section of a railway track. In yet another embodiment, the incident is associated with clamping of the End-of-Train device to the train. In yet another embodiment, the incident is associated with presence of a broken component inside a housing of the End-of-Train device. In yet another embodiment, the incident is associated with an atmospheric condition.

The method further comprises analyzing the audio signal, by the processing unit, to identify one or more actions to be performed at the End-of-Train device. In an embodiment, analyzing the audio signal to identify one or more actions to be performed at the End-of-Train device further comprises extracting one or more features from the audio signal, and identifying the at least one event associated with the audio signal based on the one or more features using a classification model. The method further comprises initiating execution of the one or more actions identified, by the processing unit. In an embodiment, the one or more actions is associated with controlling an operation of the End-of-Train device. In an embodiment, the method further comprises generating a notification based on execution of the one or more actions. Further, the notification is outputted in audio format via an audio output unit associated with the End-of-Train device. In a further embodiment, the method further comprises storing the audio signal and the notification in audio format as a downloadable audio file in a storage unit of the End-of-Train device,

BRIEF DESCRIPTION OF FIGURES

The present invention is further described hereinafter with reference to illustrated embodiments shown in the accompanying drawings, in which.

DETAILED DESCRIPTION

Figure 1:
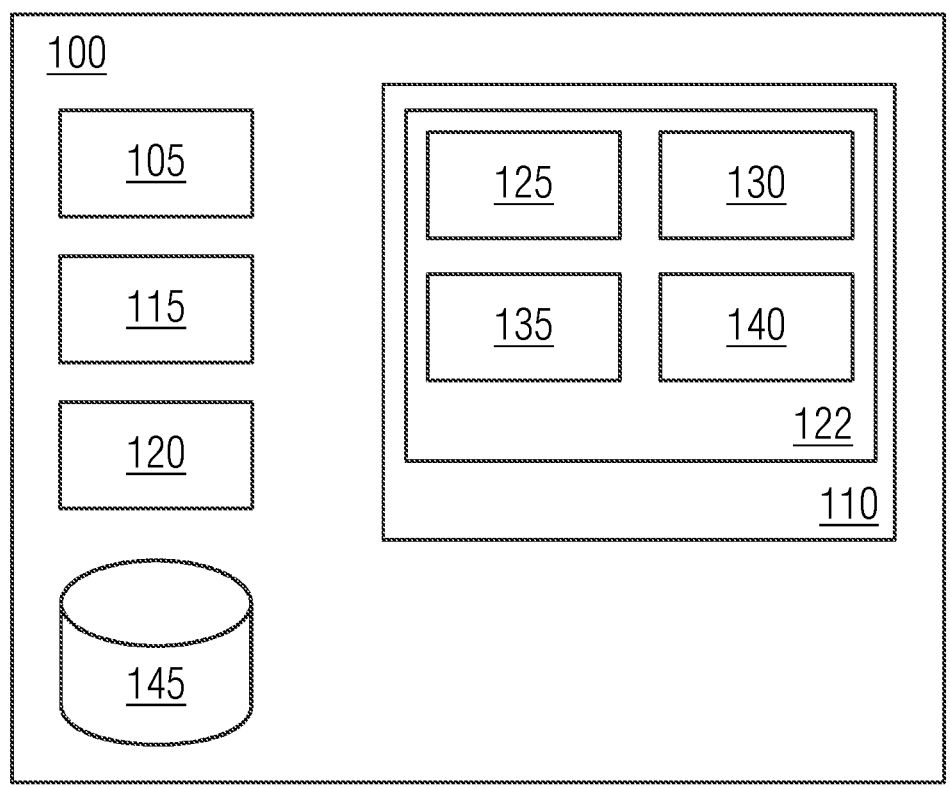
FIG. 1 shows a functional block diagram of an End-of-Train device, in accordance with an embodiment of the present invention.

Various embodiments of the present invention are described with reference to the drawings, where like reference numerals are used in reference to the drawings. Like reference numerals are used to refer to like elements throughout. In the following description, numerous specific details are set forth in order to provide a thorough understanding of embodiments. These specific details need not be employed to practice embodiments. In other instances, well known materials or methods have not been described in detail in order to avoid unnecessarily obscuring embodiments. While the disclosure is susceptible to various modifications and alternative forms, specific embodiments thereof are shown by way of example in the drawings and will herein be described in detail. There is no intent to limit the disclosure to the particular forms disclosed. Instead, the disclosure is to cover all modifications, equivalents, and alternatives falling within the scope of the present invention.

FIG. 1 illustrates functional block diagram of the End-of-Train device 100, in accordance with an embodiment of the present invention. The End-of-Train device 100 includes an audio input unit 105, a memory 110, a processing unit 115 and an audio output unit 120. The audio input unit is configured to detect an audio input associated with at least one event. In an embodiment, the event is utterance of a command by a railway personnel. For example, the railway personnel may provide the command 'PUT TO SLEEP' to the End-of-Train device 100, for switching a mode of the End-of-Train device 100 from active mode to sleep mode. The utterance of the command by the railway personnel produces acoustic waves that are detected by the audio input unit 105. In another embodiment, the event is an incident associated with a potential impact on operation of at least one equipment onboard the train. In an example, the incident is detecting loose clamping of the End-of-Train device 100. The audio input corresponds to rattling of the End-of-Train device 100 housing due to improper clamping of the End-of-Train device 100 to the train. In another example, the event is detecting an atmospheric condition, for example, presence of storms. In yet another example, the event is entry of the train into the tunnel or exit of the train into the tunnel. In yet another example, the event is associated with detecting successful shunting of the train. In yet another example, the event is associated with detecting faulty components within the housing of the End-of-Train device 100. In yet another example, the event is associated with detecting faulty railway tracks.

The audio input unit 105 may include any acoustic transducer capable of detecting an audio input. The acoustic transducer detects the audio input based on changes in acoustic pressure in an environment of the End-of-Train device 100. In the present embodiment, the acoustic transducer is a microphone comprising a capacitive pressure transducer. The acoustic transducer generates an audio signal in analogue format based on the detected changes in the acoustic pressure.

The processing unit 115 may include any type of computational circuit, such as, but not limited to, a microprocessor, microcontroller, application specific integrated circuits, single-chip computers, and the like. The memory 110 may include one or more of a volatile memory and a non-volatile memory. The memory 110 may be coupled for communication with the processing unit 115. The processing unit 115 may execute instructions and/or code stored in the memory 110. The memory 110 may include any suitable elements for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like. The memory 110 comprises an audio support module 122 in the form of machine-readable instructions. These machine-readable instructions when executed by the processing unit 115 causes the processing unit 115 to initiate execution of one or more actions based on an audio input. In addition, the machine-readable instructions also cause the processing unit 115 to generate notifications based on one or more events. The audio support module 122 comprises an authentication module 125, an input processing module 130, an audio analysis module 135 and an output generation module 140.

The authentication module authenticates a railway personnel based on a password. The password may be configured by the railway personnel, for example, during installation of the End-of-Train device 100. The railway personnel may enter the password on a keypad provided on the End-of-Train device 100. In another embodiment, the railway personnel may enter the password on a client application installed on an electronic device (not shown) such as a mobile phone. The client application may further transmit the password to the End-of-Train device 100 via Bluetooth network. The authentication module is configured to verify the password against an actual password stored in the memory 110 of the End-of-Train device 100. If the password entered by the railway personnel matches the actual password, the railway personnel is provided access to the End-of-Train device 100. Subsequently, the railway personnel may provide voice commands to the End-of-Train device 100, Otherwise, access to the End-of-Train device 100 is denied. In yet another embodiment, the railway personnel may provide the password as a voice input to the End-of-Train device 100. The voice input is further authenticated by comparing with an audio clip stored in the memory 110 of the End-of-Train device 100. Upon authentication, the railway personnel is provided access to the End-of-Train device 100.

The input processing module 130 is configured to pre-process the audio signal to improve a quality of the audio signal. In an embodiment, noise reduction techniques are employed to remove noise from the audio signal. Further, the input processing module 130 may also sample the audio signal for further processing by the audio analysis module 135. The audio analysis module 135 is configured to analyze the audio input to identify one or more actions to be performed at the End-of-Train device 100. The audio analysis module 135 is further configured to initiate execution of the one or more actions identified. The output generation module 140 is configured to generate a notification based on execution of the one or more actions. In an embodiment, the notification is converted into an analog signal based on a predefined logic. The audio output unit 120 is configured to output the notification in audio format. More specifically, the audio output unit 120 comprises an electroacoustic transducer that converts the analog signal corresponding to the notification into an audio output. In another embodiment, the notifications may also be outputted in visual format on one or more displays associated with the End-of-Train device 100. In yet another embodiment, the output generation module 140 may generate a textual notification. For example, the textual notification may be 'SHUNT SUCCESSFUL'. The audio output unit 120 may further include a text-to-speech synthesizer for converting the textual notification to an audio output. As a person skilled in the art is familiar with the functioning of text-to-speech synthesizers, the functioning is not elaborated in detail herein.

In addition to the above, the End-of-Train device 100 further includes a storage unit 145 comprising a local database. The storage unit 145 may include, but is not limited to, storage disks, Secure Digital (SD) cards and external flash memory. The local database may store templates for text and pre-recorded sounds. The pre-recorded sounds are stored as audio files. The audio files may be accessed by the processing unit 115 for playing a pre-recorded sound through the audio output unit 120.

The End-of-Train device 100 may be configured manually by a railway personnel in order to adjust settings related to audio functionalities. The settings may include, but not limited to, an output volume of the audio output unit 120, a language of the audio output, a language of the audio input, enabling or disabling the audio input unit 105, enabling or disabling the audio output unit 120 and so on. For example, the user may choose to disable audio outputs or mute the audio outputs and configure the End-of-Train device 100 for visual notifications only. In another example, the user may select the language of the audio output as Spanish. In yet another example, the user may select the language of the audio input as Spanish in order to enable the End-of-Train device 100 to understand audio commands in Spanish. In addition to the above, the End-of-Train device 100 may also be configured to repeat an audio output for a specific count.

Figure 2:
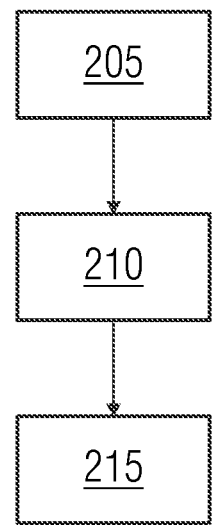
FIG. 2 shows a flowchart of a method for providing audio support on an End-of-Train device, in accordance with an exemplary embodiment of the present invention.

FIG. 2 shows a flowchart of a method 200 for providing audio support on the End-of-Train device 100, in accordance with an exemplary embodiment of the present invention. In the present embodiment, the at least one event is utterance of a voice command by an authorised railway personnel. In the present embodiment, the authentication module firstly determines whether a user accessing the End-of-Train device 100 is authorised. The user may enter the password through a keypad provided on the End-of-Train device 100. Upon verifying the password, the authentication module authenticates the user for access to the End-of-Train device 100. The user may further provide the voice command to the End-of-Train device 100.

The audio input unit 105 detects the audio input based on changes in acoustic pressure around the microphone. Further, the microphone generates an analog electrical signal that forms an audio signal indicative of the changes in the acoustic pressure. In other words, the audio signal is an electrical representation of the changes in the acoustic pressure resulting from utterance of the voice command. At step 205, the audio signal associated with the at least one event is received, by the processing unit 115. The input processing module 130 further preprocesses the audio signal in order to improve a quality of the audio signal. The quality may be improved by noise reduction techniques such as single-ended pre-recording, single-ended hiss reduction or codec that are well-known in the art.

At step 210, the audio signal is analyzed, by the processing unit 115, to determine one or more actions to be performed at the End-of-Train device 100. In the present embodiment, the audio signal is analyzed, by the audio analysis module 135, by extracting one or more features associated with the audio signal. The one or more features may include amplitude, frequency and phase of the audio signal. In another embodiment, the audio signal is converted to a digital signal by an analog-to-digital converter in the audio input unit 105. Further, the features associated with the digital signal, such as frequency and phase are extracted.

The one or more features extracted are further provided as input to a classification model. The classification model is a machine learning model that classifies the audio signal into one of a set of predefined audio commands based on the features. For example, the classification model may be pretrained using audio signals corresponding to various events. In the present example, the classification model may be pretrained based on three commands: ARM DEVICE, PUT TO SLEEP, SHUNT STATUS. If the audio command is ARM DEVICE at step 205, the classification model generates an output label indicative of the command ARM DEVICE. Similarly, if the audio command is SHUNT STATUS, the classification model generates an output label indicative of the command SHUNT STATUS. In another embodiment, the audio input may be compared to predefined audio samples in order to identify the audio command. For example, a pattern associated with the audio input is compared with a pattern of the predefined audio samples, in order to identify a closest matching audio sample. Further, a command associated with the closest matching audio sample is determined, for example, from a look up table.

The one or more actions to be performed are identified based on the identified audio input. In the present embodiment, the one or more actions are identified from a predefined list of actions corresponding to the output label generated by the classification model, stored in a lookup table. For example, if the voice command is 'PUT TO SLEEP', then the one or more actions comprises changing the mode of the End-of-Train device 100 from active mode to sleep mode. Therefore, the one or more actions may be associated with controlling an operation of the End-of-Train device 100.

At step 215, execution of the one or more actions identified are initiated, by the processing unit 115. If the audio command is identified as ARM DEVICE, then one or more actions for arming the End-of-Train device 100 to a Head-of-Train device (not shown) of the train is initiated. For example, the one or more actions may include transmitting a handshake signal from the End-of-Train device 100 to the Head-of-Train device via a telemetry link. If the audio command is identified as SHUNT STATUS, the one or more actions is associated with determining whether shunt operation of the train is successful and outputting a notification indication the status of the shunt operation. The status of the shunt operation may be identified as explained in FIG. 4.

In an embodiment, the one or more actions also include generating an audio notification via the audio output unit 120. The audio notification is a pre-recorded sound selected from a list of pre-recorded sounds, stored in the storage unit 145, based on the one or more actions and based on a status of the End-of-Train device 100. For example, once the arming of the End-of-Train device 100 to the Head-of-Train device is completed, an pre-recorded sound corresponding to ARMED status may be identified from the list of pre-recorded sounds and played via the audio output unit 120. The pre-recorded sound may be played for predefined number of times, say 3 times, based on a configuration of the End-of-Train device 100. Similarly, in the example of shunting, the audio recording may correspond to one of SHUNT SUCCESSFUL or SHUNT UNSUCCESSFUL.

Figure 3:
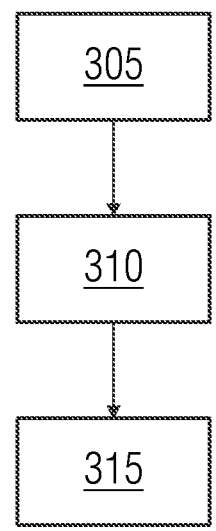
FIG. 3 shows a flowchart of a method for providing audio support on an End-of-Train device, in accordance with another exemplary embodiment of the present invention.

Similarly, the End-of-Train device 100 may also identify occurrence of an incident that may potentially impact operation of at least one equipment onboard the train, based on audio inputs as explained in FIG. 3.

FIG. 3 shows a flowchart of a method 300 for providing audio support on the End-of-Train device 100, in accordance with another exemplary embodiment of the present invention. In the present embodiment, the event is an incident impacting operation of at least one equipment onboard the train. The method 300 is explained by taking the example of a shunting operation. The shunting operation involves shunting of the train with an additional train car at the rear end. A successful shunting operation is indicated by a characteristic sound of the additional train car coupling with the train. The characteristic sound results in a change in the acoustic pressure detected by the audio input unit 105. For example, the audio input unit 105 may continuously detect ambient sounds in real-time. The characteristic sound from the shunting operation acts as the audio input to the audio input unit 105. The audio input unit 105 further generates an analogue electrical signal, i.e., an audio signal, indicative of the audio input.

At step 305, the audio signal associated with the at least one event is received by the processing unit 115. The input processing module 130 may further preprocess the audio signal using noise reduction algorithms to improve a quality of the audio signal by eliminating ambient noises At step 310, the audio signal is analyzed to identify one or more actions to be performed at the End-of-Train device 100. More specifically, one or more features of the audio signal are extracted. The extracted features are further fed to a classification model to determine one or more actions to be performed at the End-of-Train device 100. The classification model is a machine learning model pretrained using audio samples associated with a plurality of incidents. Consequently, the classification model may accurately identify any incident, among the plurality of incidents, based on the features associated with the corresponding audio signal. Similar to step 210 of method 200, the one or more actions are identified from a look-up table based on an output label generated by the classification model.

At step 315, execution of the one or more actions is initiated, by the processing unit 115. In an embodiment, the one or more actions include generating a notification indicating successful shunting. In the present embodiment, the notification is generated as an audio notification at the End-of-Train device 100. In an example, the audio notification is generated by firstly identifying an pre-recorded audio, from the storage unit 145, corresponding to the output label generated by the classification model. Further, the pre-recorded sound is played via the audio output unit 120, as the audio notification. In another embodiment, the notification is transmitted as a message to an onboard equipment. For example, the onboard equipment may be a driver-machine interface.

In another embodiment, the incident corresponds to clamping of the End-of-Train device 100. The End-of-Train device 100 is typically clamped to the train by a railway personnel. However, successful clamping of the End-of-Train device 100 to the train produces a characteristic sound. The characteristic sound is further detected by the audio input unit 105 and processed by the audio support module as explained in method 200. Further, a notification indicating successful clamping is generated. In the present embodiment, the notification is generated as an audio output via the audio output unit 120. In another embodiment, the notification is transmitted from the End-of-Train device 100 to the Head-of-Train device. The Head-of-Train device may be further configured to display the notification via the Driver Machine Interface. In another embodiment, the notification may also be transmitted to a central server (not shown). The central server may further store or process the notification to determine events associated with the train.

In yet another embodiment, faulty or broken components inside the End-of-Train device 100 may also be identified, using method 200, based on the characteristic sound of rattling inside the housing of the End-of-Train device 100. The rattling sound may also be a result of loose components such as screws, presence of rock, sand etc. Further, a notification indicating the presence of broken components inside the End-of-Train device 100 may be generated as an audio output via the audio output unit 120 or as visual indication on the display of the End-of-Train device 100.

In yet another embodiment, entry of the train into a tunnel or exit out of the tunnel may also be identified using method 200. The entry of the train into the tunnel as well as the exit out of the tunnel are associated with characteristic sounds. Based on the characteristic sounds, the incidents are identified as one of entry of train into a tunnel and exit from tunnel. In an example, the one or more actions comprises identifying time-stamps corresponding to the entry and the exit from the analysis of the audio signals. The time-stamps are further stored in the memory 110 of the End-of-Train device 100 or transmitted to the central server or the Head-of-Train device for further processing. For example, the time-stamps are transmitted to the central server in order to indicate that the train is passing through the tunnel. Similarly, the central server may use the time-stamps to create logs associated with events. In another embodiment, the time-stamps may also be transmitted to the Head-of-Train device for logging of events.

In yet another embodiment, the incident is passing of the train over a faulty section of a railway. The characteristic sound produced by the wheels of the train while passing over the faulty section may be analyzed to identify the incident as passing over faulty railway track. Further, the End-of-Train device 100 may transmit a GPS location corresponding to a time-stamp of the characteristic sound to the central server. The GPS location may help railway personnel in rectifying the faulty section. In an embodiment, the central server may transmit a notification indicating the GPS location of the faulty section to one or more other trains within a radius of the faulty section.

In yet another embodiment, the incident is associated with an atmospheric condition. In an example, adverse weather conditions such as storms or rains may lead to submerged tracks, landslides etc. that may impact the operation of the train. In such conditions, characteristic sounds associated with storms or rains may be analyzed to identify the atmospheric condition. Further, the incident may be notified to the central server in order to warn railway authorities about the adverse weather conditions. In an embodiment, the central server may transmit a notification indicating the adverse weather conditions to one or more other trains in a geographical zone associated with the weather condition.

In a further embodiment, the audio outputs along with the characteristic sounds may be recorded using a recording medium such as an electronic disk. Further, a railway personnel may playback the recordings at a convenient time. For example, the railway personnel may choose to playback recordings from previous one hour. In yet another embodiment, the audio outputs along with the characteristic sounds may be compiled as a audio file and stored in the storage unit 145. The railway personnel may further download the audio file, for example, via a client application on an electronic device. In another embodiment, the audio files may be downloaded on the electronic device via Bluetooth transfer.

Figure 4:
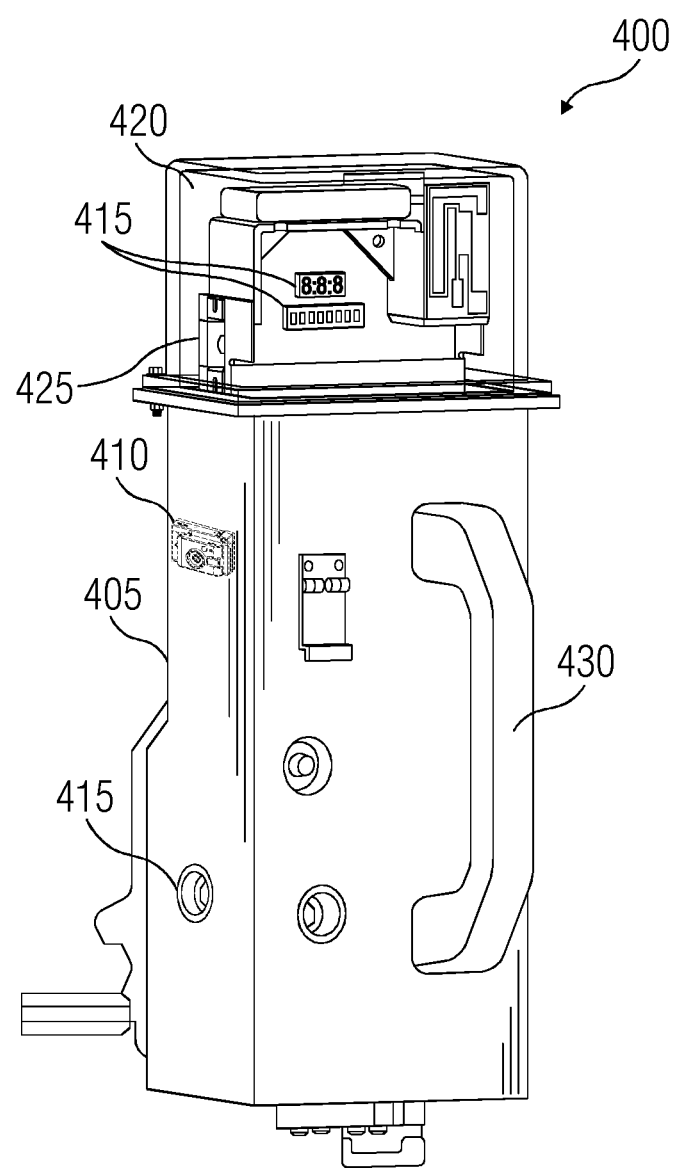
FIG. 4 shows a schematic view of an End-of-Train device, in accordance with an embodiment of the present invention.

FIG. 4 shows a schematic view of a End-of-Train (EOT) device 400, in accordance with an exemplary embodiment of the present invention. The End-of-Train device 400 comprises an enclosure 405 that houses an audio input unit. The enclosure 405 may be made of, for example, plastic, metal or alloy. In the present embodiment, the audio input unit is a microphone 410 attached to the enclosure as shown. In another embodiment, an external microphone may be connected to an audio input jack provided on the enclosure 405 through a connector cable. The enclosure 405 further houses an audio output unit. In the present embodiment, the audio output unit is a loudspeaker 415 attached to the enclosure 405 as shown.

The End-of-Train device 400 further includes one or more displays 415 housed in a transparent dome 420 provided on top of the enclosure 405. The transparent dome 420 may be made of, for example, plastic or glass. The one or more displays 415 display information and/or data provided by the End-of-Train device 400. The End-of-Train device 400 further includes a High Visibility Marker light (HVM) 425 used to illuminate a rear end of the train. The End-of-Train device 400 is coupled to the rear-end of a train (not shown) using a clamping unit (not shown) attached to the enclosure 405. The term 'train' as used herein may refer to any rail vehicle used in mass transit, mainline transit or freight transportation over a railway track. The End-of-Train device 400 further comprises a handle 430 attached to the enclosure 405 for handling such as installation and removal of the End-of-Train device 400 on/off a train car of the train, in particular a last train car.

In addition to the above, the End-of-Train device 400 may also include other components such as cell phone transceivers, systems for monitoring/controlling brake lines, communication systems for communicating with other units such as Head-of-Train devices and the like. A person having ordinary skill in the art is familiar with structure, components and functions of different types of End-of-Train devices, and therefore, these aspects will not be described in further detail herein.

Advantageously, the present invention helps in identifying various incidents that may impact an operation of the train through audio analysis. The present invention also helps railway personnel to provide voice commands to the End-of-Train device, thereby eliminating the need to use hard keys on the End-of-Train device. Furthermore, the present invention also facilitates audio notifications on the End-of-Train device. Further, audio files comprising characteristic sounds associated with events may be stored in the End-of-Train device for playback by railway personnels at a later point of time, thereby eliminating the need for scanning event logs.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

The invention claimed is:

1. An End-of-Train device suitable for mounting at on a train, comprising:
an audio input unit configured to:
detect an audio input associated with at least one event; and
generate an audio signal corresponding to the audio input;
a memory; and
a processing unit communicatively coupled to the memory, wherein the processing unit is configured to execute one or more instructions in the memory to:
analyze the audio signal to identify one or more actions to be performed by the End-of-Train device, wherein analyzing the audio signal comprises:
extracting one or more features from the audio signal; and
identifying the at least one event associated with the audio signal based on the one or more features using a classification model; and
initiate execution of the one or more actions identified.

2. The End-of-Train device of claim 1, wherein the processing unit is further configured to execute one or more instructions in the memory to:
generate a notification based on execution of the one or more actions.

3. The End-of-Train device of claim 2, further comprising:
an audio output unit configured for outputting the notification in audio format.

4. The End-of-Train device of claim 1, wherein the event is utterance of a voice command by a railway personnel.

5. The End-of-Train device of claim 1, wherein the event is an incident with a potential impact on operation of at least one equipment onboard the train.

6. The End-of-Train device of claim 1, wherein the one or more actions is associated with controlling an operation of the End-of-Train device.

7. A method for providing audio support on an End-of-Train device, the method comprising:
receiving an audio signal, by a processing unit, wherein the audio signal is generated from an audio input associated with at least one event, detected by an audio input unit communicatively coupled to the processing unit;
analyzing the audio signal, by the processing unit, to identify one or more actions to be performed at the End-of-Train device, wherein the analyzing the audio signal comprises:
extracting one or more features from the audio signal; and
identifying the at least one event associated with the audio signal based on the one or more features using a classification model; and
initiating execution of the one or more actions identified, by the processing unit.

8. The method of claim 7, further comprising:
generating a notification based on execution of the one or more actions.

9. The method of claim 8, further comprising:
outputting the notification in audio format via an audio output unit associated with the End-of-Train device.

10. The method of claim 9, further comprising:
storing the audio signal and the notification in audio format as a downloadable audio file in a storage unit of the End-of-Train device.

11. The method of claim 7, wherein the event is utterance of a voice command by a railway personnel.

12. The method of claim 7, wherein the event is an incident with a potential impact on operation of at least one equipment onboard the train.

13. The method of claim 7, wherein the one or more actions is associated with controlling an operation of the End-of-Train device.

14. The method of claim 12, wherein the incident is associated with a shunting operation.

15. The method of claim 12, wherein the incident is associated with passing of the train over a faulty section of a railway track.

16. The method of claim 12, wherein the incident is associated with clamping of the End-of-Train device to the train.

17. The method of claim 12, wherein the incident is associated with presence of a broken component inside a housing of the End-of-Train device.

18. The method of claim 12, wherein the incident is associated with an atmospheric condition.

19. An End-of-Train device suitable for mounting at on a train, comprising:
an audio input unit configured to:
detect an audio input associated with at least one event; and
generate an audio signal corresponding to the audio input;
a memory; and
a processing unit communicatively coupled to the memory, wherein the processing unit is configured to execute one or more instructions in the memory to:
analyze the audio signal to identify one or more actions to be performed by the End-of-Train device; and
initiate execution of the one or more actions identified;
wherein the event is an incident with a potential impact on operation of at least one equipment onboard the train, and the incident is associated with at least one of a shunting operation, a passing of the train over a faulty section of a railway track, a clamping of the End-of-Train device to the train, and a presence of a broken component inside a housing of the End-of-Train device.

20. A method for providing audio support on an End-of-Train device, the method comprising:

receiving an audio signal, by a processing unit, wherein the audio signal is generated from an audio input associated with at least one event, detected by an audio input unit communicatively coupled to the processing unit;

analyzing the audio signal, by the processing unit, to identify one or more actions to be performed at the End-of-Train device; and initiating execution of the one or more actions identified, by the processing unit;

wherein the event is an incident with a potential impact on operation of at least one equipment onboard the train, and the incident is associated with at least one of a shunting operation, a passing of the train over a faulty section of a railway track, a clamping of the End-of-Train device to the train, and a presence of a broken component inside a housing of the End-of-Train device.

* * * * *